Feb. 11, 1958   H. B. BARRETT   2,822,621
BRAKE DRUM GAUGES
Filed Nov. 9, 1953
FIG. 1.
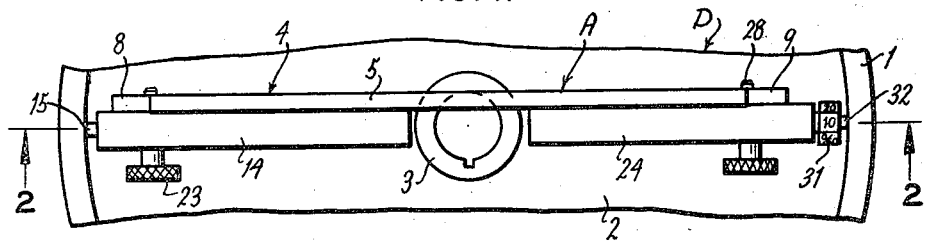
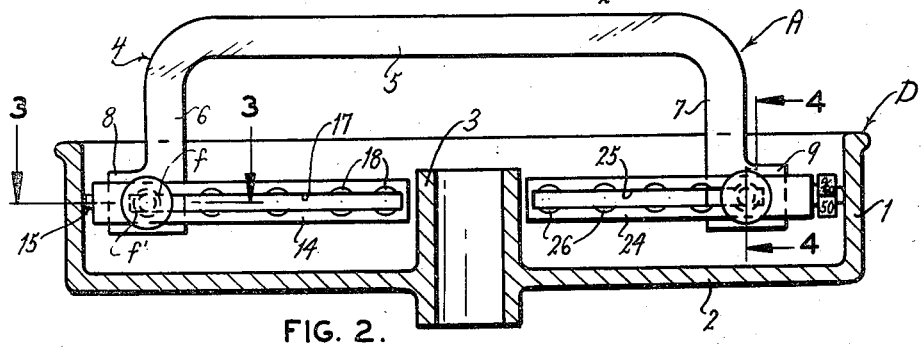
FIG. 2.
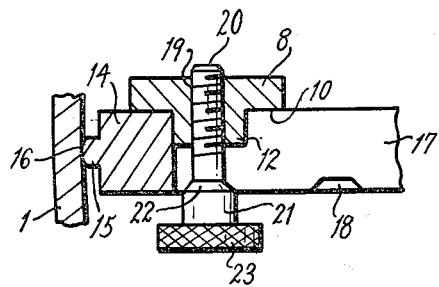
FIG. 3.
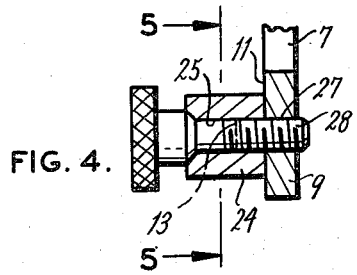
FIG. 4.
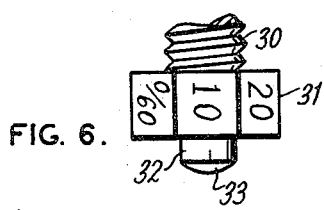
FIG. 6.
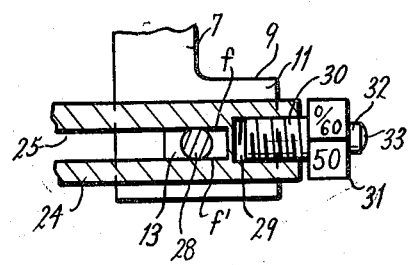
FIG. 5.
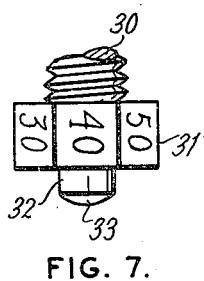
FIG. 7.
INVENTOR.
HARRY B. BARRETT
BY *Alfred W. Petchaft*
ATTORNEY

United States Patent Office 2,822,621
Patented Feb. 11, 1958

2,822,621

BRAKE DRUM GAUGES

Harry B. Barrett, Clayton, Mo.

Application November 9, 1953, Serial No. 390,898

7 Claims. (Cl. 33—165)

This invention relates in general to certain new and useful improvements in brake drum gauges.

In installing, repairing and adjusting automotive brakes, it is frequently necessary to measure the internal diametral size of the brake drum. Particularly where the drum is scored or out of round and must be turned, it is necessary to measure the brake drum accurately and quickly. Similarly, in making an initial examination of brake drums it is desirable to detect an out of round condition and ascertain the amount thereof as a guide to determining whether the drum can be satisfactorily turned, and if so, how much turning must be done.

It is, therefore, one of the primary objects of the present invention to provide a gauge which is adapted for quick, accurate and convenient measurement of the inside diameter of an automotive brake drum or similar device.

It is another object of the present invention to provide a brake drum gauge which is simple in construction and can be produced accurately but at relatively low cost.

It is an additional object of the present invention to provide a gauge which can be quickly adjusted to fit within and measure brake drums of various different diameters and size ranges.

It is also an object of the present invention to provide a brake drum gauge which is so constructed as to clear the wheel hub and other outwardly projecting elements forming a part of the wheel structure.

With the above and other objects in view, my invention resides in the novel features of form, construction, arrangement, and combination of parts presently described and pointed out in the claims.

In the accompanying drawings (one sheet)—

Figure 1 is a top plan view of a brake drum gauge constructed in accordance with and embodying the present invention, and illustrating the manner in which such gauge is actually used in a brake drum;

Figure 2 is a longitudinal sectional view taken along lines 2—2 of Figure 1;

Figures 3 and 4 are fragmentary transverse sectional views taken along lines 3—3 and 4—4, respectively, of Figure 2;

Figure 5 is a fragmentary sectional view taken along lines 5—5 of Figure 4; and

Figures 6 and 7 are enlarged top and bottom plan views, respectively, of the calibrated micrometer knob forming a part of the present invention.

Referring now in more detail and by reference characters to the drawings, a preferred embodiment of the present invention, A designates a brake drum gauge constructed in accordance with and embodying the present invention and adapted for use in measuring brake drums, such as, for example, the brake drum D which integrally includes an annular rim 1 and a circular end wall 2 centrally provided with a tubular hub 3 which projects for a substantial distance on both sides thereof, as best seen in Figure 2.

The brake drum gauge A comprises a U-shaped frame 4 which may be stamped or otherwise formed from a suitable material such as heavy steel plate and integrally includes an elongated bight-portion 5, and two relatively short parallel legs 6, 7, each terminating in laterally enlarged or projecting end-plates 8, 9, respectively. The end-plates 8, 9, are furthermore, provided with outwardly presented lateral faces 10, 11, respectively, which are in turn formed with outwardly projecting bosses 12, 13, each having top and bottom guide faces $f$, $f'$, which are parallel to the longitudinal axis of the elongated bight-portion 5, the guide faces $f$, $f$, and $f'$, $f'$ being respectively co-planar.

Provided for slidable disposition upon the lateral face 10 of the end-plate 8 is an elongated gauge bar 14 which is turned down at its outer end in the provision of a small longitudinally projecting contact knob 15 having an outwardly presented end face 16, which is ground off to a spherical curvature. The gauge bar 14 is also provided with a closed-end longitudinal slot 17 provided at spaced intervals with diametrally-enlarged conical seats 18 which have their centers coincident with the center line of the slot 17 and in effect straddle it, as shown in Figure 2.

The end-plate 8 is drilled and tapped in the region of the boss 12 to provide an internally threaded bore 19 for receiving a threaded stud 20 having an outside diametral size slightly smaller than the width of the slot 17 and being provided at its outer end with a diametrally enlarged head 21 which is provided with a tapered face 22 for self-aligning disposition within any one of the seats 18. The head 21 is in turn integrally provided at its outer end with a diametrally enlarged knurled knob 23 to facilitate manual rotation of the stud 20 as it is threaded in and out of the bore 21.

Similarly mounted upon the laterally presented face 11 of the end-plate 9 is a gauge bar 24 having a longitudinal slot 25 with a series of spaced tapered seats 26 substantially identical with the corresponding elements of the previously described gauge bar 14. The end-plate 9 is drilled and tapped in the region of the boss 13 to provide an internally threaded bore 27 for receiving a threaded stud 28 respectively similar in shape, construction and function to the previously described bore 19 and threaded stud 20.

At its outer end, the gauge bar 24 is axially drilled and tapped to provide an internally threaded bore 29 adapted to receive an extenally threaded stud 30 integrally provided with a diametrally enlarged knob 31 which is provided around its outer periphery with 6 flat faces which are respectively lettered with the legends or indicia, "0/60," "10," "20," "30," "40," "50," "60," as best seen in Figures 5, 6, and 7. Outwardly of the knob 31 the stud is provided with a projecting contact pin 32 having an outer face 33 of spherical curvature.

The threads of the bore 29 and stud 30 are accurately machined so that the stud will shift outwardly sixty thousandths (.060) of an inch for each complete rotation thereof when the flat face bearing the legend "0/60" is in upwardly presented position, that is to say, the position shown in Figure 1. The stud 30 will be threaded to its inwardmost position within the bore 29 and, in this position, the distance between the contact points of the spherically curved faces 16, 33, will be precisely 8.00 inches when the studs 20 are in the seats 18, as shown in Figure 2. Inasmuch as the distance between the center lines of adjacent seats 18 is exactly .50 inch it is possible, by adjusting the gauge bars 14 and 24 outwardly so that one or both of the studs 20 will be set in different seats 18, that the distances can be varied in half-inch intervals from 8.00 inches to 12.00 inches. By this means the brake drum gauge A can be very quickly and conveniently set to accommodate any size of brake drum between 8 and 12 inches in diameter, which range embraces all conventional passenger car sizes now in use in this country.

By setting the brake drum gauge A to the particular diametral size of the drum being inspected, for example, 8.00 inches as shown in Figures 1 and 2, it is possible to slip the gauge A into the drum D. All brake drums which have been in use are slightly oversize and, therefore, the gauge A will fit diametrally across the drum D with a very slight amount of end play. If the drum D is almost unworn and is, therefore, only a few thousandths oversize the gauge A will just barely fit when the calibration stud 30 is threaded inwardly to its innermost limits, with the legend-numeral "0/60" in upwardly presented position.

If the brake drum D is appreciably worn, the gauge A will fit rather loosely and the mechanic, by turning the knob 31 to thread the stud 30 outwardly with respect to the bar 29, can bring the contact face 33 into engagement with the inner surface of the brake drum D. In all probability, the knob 31 will stop in a position in which no one of its numbered faces will be presented flatwise upwardly. In such case, however, the mechanic, by observing the two numbered faces which are most nearly in view as he looks downwardly along the leg 7, will be able to determine the amount by which the drum D is oversize. For example, if the two numbered faces are those bearing the indicia "20" and "30," the mechanic will immediately know that the particular drum D is between twenty and thirty thousandths oversize. Since automotive manufacturers and brake designers recommend sixty thousandths as the maximum limit of oversize permissible in an operative brake, it will, of course, be evident that the particular drum being examined, that is to say, one which is between twenty and thirty thousandths oversize, may be safely turned down as a part of the brake repairing operation. If, on the other hand, the brake drum is more than sixty thousandths oversize, it cannot safely be turned and must be replaced.

The brake drum gauge A, by reason of its bight-portion 5, fits conveniently over and around the projecting portions of the hub 3 and will provide adequate clearance with respect thereto. This arrangement is furthermore particularly useful when the brake drum gauge is rotated within the drum D to measure various different diameters, so that the mechanic may determine very speedily whether or not the drum D has worn eccentrically and is, therefore, out-of-round. In many instances, a brake drum, which, upon inspection, appears to be quite smooth and relatively unworn and may appear, across one diameter, to be well within the size limits or tolerance, but the drum may be out-of-round due to various accidental causes. It is, therefore, desirable to determine whether or not the drum, which otherwise appears to be in good condition, is out-of-round. The brake drum gauge A is uniquely well suited to determine this latter condition speedily and accurately.

It should be understood that changes and modifications in the form, construction, arrangement, and combination of the several parts of the brake drum gauge may be made and substituted for those herein shown and described without departing from the nature and principle of my invention.

Having thus described my invention, what I claim and desire to secure by Letters Patent is:

1. A brake drum gauge comprising a frame having spaced terminal portions having laterally presented coplanar flat faces, longitudinally aligned upstanding bosses on said flat faces, said bosses each having oppositely presented flat surfaces which are respectively co-planar with the corresponding flat surfaces of the other boss, brake drum contacting elements having elongated slots for slidable disposition upon said bosses whereby said elements are adjustably supported in endwise alignment for diametral disposition within a brake drum, means mounted in each boss for releasable engagement with the element mounted on such boss whereby to hold the element in a selected position of adjustment, and a vernier contactor adapted for endwise engagement against the brake drum surface, said vernier contactor being adjustably mounted in one of said contacting elements.

2. A brake drum gauge comprising a frame having spaced terminal portions having laterally presented coplanar flat faces, longitudinally aligned upstanding bosses on said flat faces, said bosses each having oppositely presented flat surfaces which are respectively co-planar with the corresponding flat surfaces of the other boss, brake drum contacting elements having elongated slots for slidable disposition upon said bosses whereby said elements are adjustably supported in endwise alignment for diametral disposition within a brake drum, means mounted in each boss for releasable engagement with the element mounted on such boss whereby to hold the element in a selected position of adjustment, and a vernier contactor adapted for endwise engagement against the brake drum surface, said vernier contactor being threadedly mounted in one of said contacting elements.

3. A brake drum gauge comprising a frame having spaced terminal portions having laterally presented coplanar flat faces, longitudinally aligned upstanding bosses on said flat faces, said bosses each having oppositely presented flat surfaces which are respectively co-planar with the corresponding flat surfaces of the other boss, brake drum contacting elements having elongated slots for slidable disposition upon said bosses whereby said elements are adjustably supported in endwise alignment for diametral disposition within a brake drum, means mounted in each boss for releasable engagement with the element mounted on such boss whereby to hold the element in a selected position of adjustment, and a vernier contactor adapted for endwise engagement against the brake drum surface, said vernier contactor being threadedly mounted in one of said contacting elements and having a plurality of flat indicia-bearing faces around its periphery.

4. A brake drum gauge comprising a central U-shaped frame having an elongated bight and spaced parallel legs, each of said legs being provided with a flat-faced terminal portion having an upstanding parallel-sided boss, an elongated slotted bar slidably mounted on each boss for movement into a series of different positions, a screw threadedly mounted in each boss for locking the bar associated therewith in any one of its different positions, and a vernier contactor movably mounted in the outer end of one of said bars.

5. A brake drum gauge comprising a central U-shaped frame having an elongated bight and spaced parallel legs, each of said legs being provided with a flat-faced terminal portion having an upstanding parallel-sided boss, an elongated slotted bar slidably mounted on each boss for movement into a series of different positions, a screw threadedly mounted in each boss for locking the bar associated therewith in any one of its different positions, and a vernier contactor threadedly mounted in the outer end of one of said bars, said vernier contactor including a plural-sided nut-like head having indicia on its several sides.

6. A brake drum gauge comprising a central U-shaped frame having an elongated bight and spaced parallel legs, each of said legs being provided with a flat-faced terminal portion having an upstanding parallel-sided boss, said bosses each having oppositely presented flat surfaces which are respectively co-planar with the corresponding flat surfaces of the other boss, an elongated slotted bar slidably mounted on each boss for movement into a series of different positions, a screw threadedly mounted in each boss for locking the bar associated therewith in any one of its different positions, and a vernier contactor movably mounted in the outer end of one of said bars.

7. A brake drum gauge comprising a central U-shaped frame having an elongated bight and spaced parallel legs, each of said legs being provided with a flat-faced terminal portion having an upstanding parallel-sided boss, said bosses each having oppositely presented flat surfaces which are respectively co-planar with the corresponding flat surfaces of the other boss, an elongated slotted bar slidably mounted on each boss for movement into a series of different positions, a screw threadedly mounted in each boss for locking the bar associated therewith in any one of its different positions, and a vernier contactor threadedly mounted in the outer end of one of said bars, said vernier contactor including a plural-sided nut-like head having indicia on its several sides.

References Cited in the file of this patent
UNITED STATES PATENTS

| | | |
|---|---|---|
| 1,127,955 | Berthold | Feb. 9, 1915 |
| 1,188,978 | Muller | June 27, 1916 |
| 1,263,142 | Stubbs | Apr. 16, 1918 |
| 1,511,624 | McGuckin | Oct. 14, 1924 |
| 1,660,469 | Bath | Feb. 28, 1928 |
| 2,060,927 | Christiani | Nov. 17, 1936 |
| 2,488,319 | Noel | Nov. 15, 1949 |
| 2,645,021 | Dierkes | July 14, 1953 |

FOREIGN PATENTS

| | | |
|---|---|---|
| 313,556 | Germany | July 26, 1919 |

OTHER REFERENCES

Product Engineering, page 176, November 1950.